(12) United States Patent
Davis

(10) Patent No.: US 9,156,706 B2
(45) Date of Patent: Oct. 13, 2015

(54) METHOD FOR PREPARING HIGH-SILICA LEV-TYPE ZEOLITES

(75) Inventor: Tracy Margaret Davis, Novato, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 771 days.

(21) Appl. No.: 13/540,825

(22) Filed: Jul. 3, 2012

(65) Prior Publication Data

US 2014/0010754 A1 Jan. 9, 2014

(51) Int. Cl.
*C01B 33/36* (2006.01)
*C01B 39/48* (2006.01)

(52) U.S. Cl.
CPC ................................ *C01B 39/48* (2013.01)

(58) Field of Classification Search
CPC ........................................... C01B 39/48
USPC ............................................. 423/704
See application file for complete search history.

(56) References Cited

U.S. PATENT DOCUMENTS

| | | | |
|---|---|---|---|
| 3,459,676 A | 8/1969 | Kerr | |
| 4,372,930 A | 2/1983 | Short et al. | |
| 4,842,836 A * | 6/1989 | Lok et al. | 423/718 |
| 5,334,367 A | 8/1994 | Rosinski et al. | |

FOREIGN PATENT DOCUMENTS

EP 0091048 10/1983

OTHER PUBLICATIONS

Shibata et al, "FAU-LEV interzeolite conversion in fluoride media", Microporous and Mesoporous Materials 138 (2011) 32-39.*
PCT International Search Report, PCT/US2013/033054, mailed Aug. 1, 2013.
S. Shibata, M. Itakura, Y. Ide, M. Sadakane and T. Sano "FAU-LEV interzeolite conversion in fluoride media" Microporous Mesoporous Mater. 138, 32-39, 2011.
A. Yashiki, K. Honda, A. Fujimoto, S. Shibata, Y. Ide, M. Sadakane and T. Sano "Hydrothermal conversion of FAU zeolite into LEV zeolite in the presence of non-calcined seed crystals" J. Cryst. Growth 325, 96-100, 2011.
T. Inoue, M. Itakura, H. Jon, Y. Oumi, A. Takahashi, T. Fujitani and T. Sano "Synthesis of LEV zeolite by interzeolite conversion method and its catalytic performance in ethanol to olefins reaction" Microporous Mesoporous Mater. 122, 149-154, 2009.
P. De Luca, D. Violante, D. Vuono, L. Catanzaro, J.B. Nagy and A. Nastro "Synthesis and characterization of Al,B-levyne type crystals from gels containing methyl-quinuclidinium ions" Microporous Mesoporous Mater. 71, 39-49, 2004.
P. Caullet, L. Delmotte, A.C. Faust J.L. Guth "Synthesis of LEV-type zeolite from aqueous nonalkaline fluoride aluminosilicate gels" Zeolites 15, 139-147, 1995.
P. Caullet, L. Delmonte, A.C. Faust and J.L. Guth "Synthesis of LEV-type zeolite from aqueous nonalkaline fluoride aluminosilicate gels" Zeolites 15, 139-147, 1995.
K. Yamamoto, T. Ikeda, M. Onodera, A. Muramatsu, F. Mizukami, Y. Wang and H. Gies "Synthesis and structure analysis of Rub-50, an LEV-type aluminosilicate zeolite" Microporous Mesoporous Mater. 128, 150-157, 2010.

* cited by examiner

*Primary Examiner* — Bijay Saha
(74) *Attorney, Agent, or Firm* — Terrence Flaherty

(57) ABSTRACT

Disclosed herein is method for preparing LEV-type zeolites from FAU-type zeolites in fluoride media using an N-methyl quinuclidinium cation as a structure directing agent.

5 Claims, 2 Drawing Sheets

METHOD FOR PREPARING HIGH-SILICA LEV-TYPE ZEOLITES

TECHNICAL FIELD

This disclosure relates generally to a method for preparing LEV-type zeolites from FAU-type zeolites using an N-methyl quinuclidinium cation as a structure directing agent.

BACKGROUND

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the *Atlas of Zeolite Framework Types*, Sixth Revised Edition, Elsevier (2007).

One known molecular sieve for which a structure has been established is the material designated as LEV, which is a molecular sieve characterized by having $4^9 6^5 8^3$ heptadecahedral cavities, to which LEV-type zeolites owe their large micropore volume (about 0.3 cm$^3$/g), although this structure has only small 8-membered ring pore openings (4.8 Å×3.6 Å). Small pore zeolites are of importance because they exhibit zeolite-specific shape selectivity for catalytic applications. In particular, such small pore zeolites having large micropore volumes are attractive due to their large adsorption capacities. Examples of LEV-type zeolites include LZ-132, NU-3, RUB-50, ZK-20 and ZSM-45.

Synthetic zeolites are often prepared from aqueous hydrothermal reaction mixtures (or synthesis mixture(s)/synthesis gel(s)) comprising sources of appropriate oxides. Organic structure directing agents can also be included in the hydrothermal reaction mixture for the purpose of influencing the production of a zeolite having the desired structure. In some cases, the formation of the zeolite requires very long crystallization times.

An alternative approach to conventional zeolite synthesis is interzeolite conversion, i.e., the hydrothermal conversion of one zeolite into another zeolite. In an article entitled "FAU-LEV interzeolite conversion in fluoride media", *Microporous Mesoporous Mater.* 138 (2011) 32-39, T. Sano et al. describe the interzeolite conversion of FAU-type zeolites into LEV-type zeolites using choline hydroxide and 1-adamantanamine as structure directing agents under hydrothermal reaction conditions. Shortened crystallization time was observed over conventional hydrothermal synthesis. T. Sano et al. report the preparation of pure LEV-type zeolites with SiO$_2$/Al$_2$O$_3$ mole ratios ranging from 10.7 to 28.6. Attempts to produce pure LEV-type zeolites at higher SiO$_2$/Al$_2$O$_3$ mole ratios were not successful.

It has now been found that LEV-type zeolites can be synthesized from FAU-type zeolites using an N-methyl quinuclidinium cation as a structure directing agent. Moreover, high-silica LEV-type zeolites (e.g., SiO$_2$/Al$_2$O$_3$ mole ratio ≥30) can be prepared.

SUMMARY

In one aspect, there is provided a method for preparing LEV-type zeolites by: (a) preparing a reaction mixture containing (1) a FAU-type zeolite; (2) fluoride ions; (3) an N-methyl quinuclidinium cation; and (4) water; and (b) maintaining the reaction mixture under conditions sufficient to form crystals of the zeolite.

In another aspect, there is provided a LEV-type zeolite made by the process described herein whose composition, as-synthesized and in the anhydrous state, in terms of mole ratios, is as follows:

|  | Broad | Exemplary |
|---|---|---|
| SiO$_2$/Al$_2$O$_3$ | 10 to 100 | 30 to 60 |
| Q/SiO$_2$ | 0.01 to 0.1 | 0.02 to 0.07 |
| F/SiO$_2$ | 0 to 0.03 | 0 to 0.03 | wherein Q is an N-methyl quinuclidinium cation.

DETAILED DESCRIPTION

Figure 1:
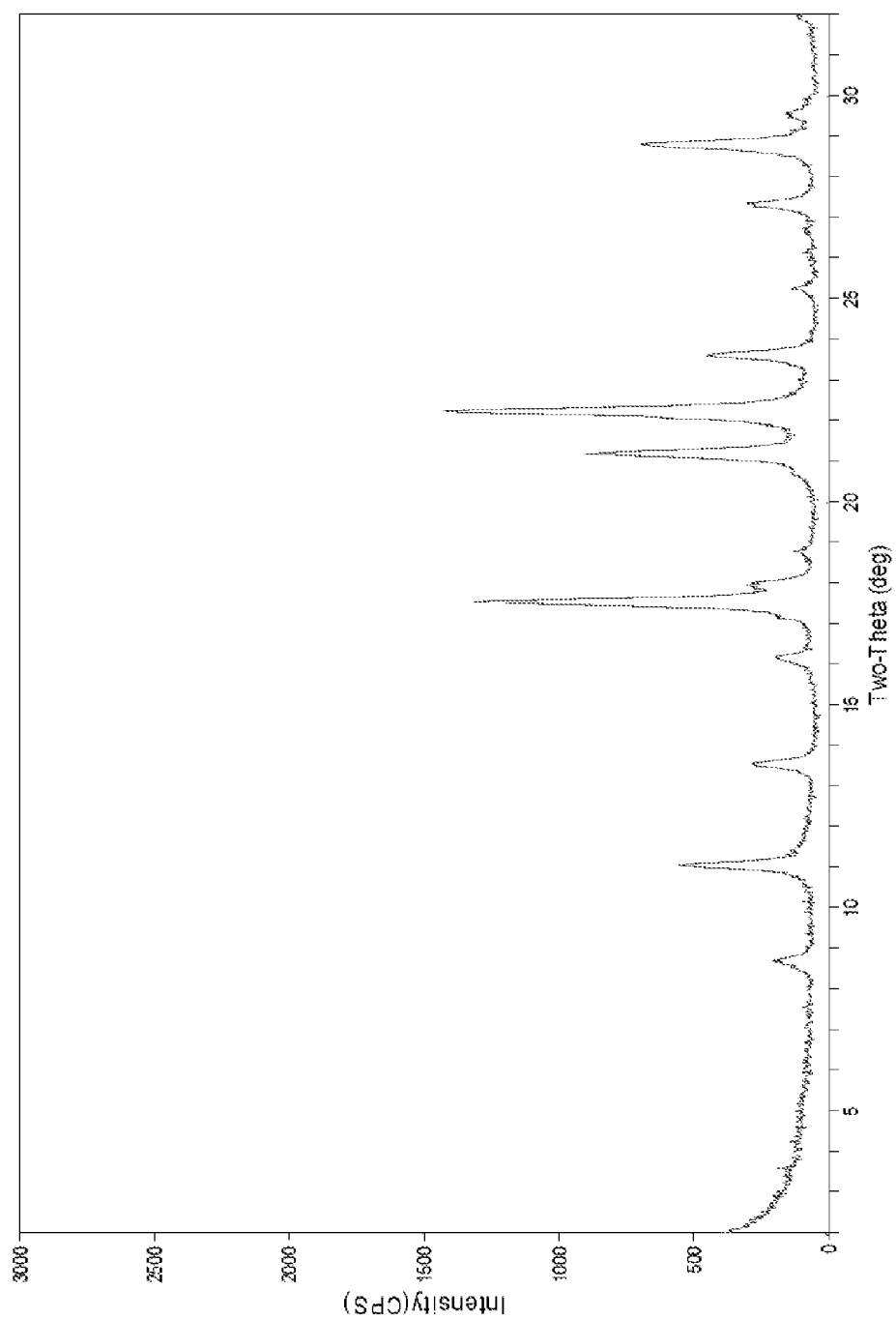
FIG. 1 shows the powder X-ray diffraction (XRD) pattern of the as-synthesized aluminosilicate product of Example 2.

The following terms will be used throughout the specification and will have the following meanings unless otherwise indicated.

The term "zeolite" generally refers to crystalline metal aluminosilicates. These zeolites exhibit a network of [SiO$_4$] and [AlO$_4$] tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically is balanced by the inclusion of cations within the crystal such as metals, alkali metals, alkaline earth metals, or hydrogen.

The term "type" is used to describe the topology and connectivity of the tetrahedrally coordinated atoms constituting the framework of the zeolite. Zeolites for which a structure has been established are assigned a three letter code and are described in the *Atlas of Zeolite Framework Types*, Ch. Baerlocher, L. . McCusker, and D. H. Olson, Sixth Revised Edition, Elsevier (2007).

Reaction Mixture

In preparing LEV-type zeolites, an N-methyl quinuclidinium cation is used as a structure directing agent ("SDA"), also known as a crystallization template. The N-methyl quinuclidinium cation is represented by the following structure (1):

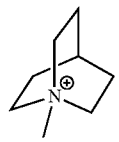

(1)

The SDA cation is typically associated with anions which can be any anion that is not detrimental to the formation of the LEV-type zeolite. Representative anions include elements from Group 17 of the Periodic Table (e.g., fluoride, chloride, bromide and iodide), hydroxide, acetate, sulfate, tetrafluoroborate, carboxylate, and the like.

In general, LEV-type zeolites are prepared by: (a) preparing a reaction mixture containing (1) a FAU-type zeolite; (2) fluoride ions; (3) an N-methyl quinuclidinium cation; and (4)

water; and (b) maintaining the reaction mixture under conditions sufficient to form crystals of the LEV-type zeolite.

The composition of the reaction mixture from which the LEV-type zeolite is formed, in terms of molar ratios, is identified in Table 1 below, wherein compositional variable Q is as described herein above.

TABLE 1

| Reactants | Broad | Exemplary |
|---|---|---|
| $SiO_2/Al_2O_3$ | 10 to 100 | 30 to 60 |
| $Q/SiO_2$ | 0.1 to 1.0 | 0.15 to 0.4 |
| $F/SiO_2$ | 0.01 to 0.5 | 0.03 to 0.1 |
| $H_2O/SiO_2$ | 3 to 50 | 5 to 30 |

Sources useful herein for FAU-type zeolites include faujasite, zeolite X, zeolite Y and ultrastable Y. A particularly useful FAU-type zeolite is zeolite Y. In some embodiments, the FAU-type zeolite has a $SiO_2/Al_2O_3$ mole ratio of from 10 to 100 (e.g., from 10 to 80, from 12 to 100, from 12 to 80, from 30 to 80, or from 30 to 60)

Sources useful herein for fluoride ions (F) include hydrogen fluoride and ammonium fluoride.

For each embodiment described herein, the reaction mixture can be supplied by more than one source. Also, two or more reaction components can be supplied by one source.

Crystallization and Post-Synthesis Treatment

In practice, the LEV-type zeolite is synthesized by: (a) preparing a reaction mixture as described herein above; and (b) maintaining the reaction mixture under crystallization conditions sufficient to form crystals of the LEV-type zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture can be subjected to mild stirring or agitation during the crystallization step. It will be understood by a person skilled in the art that the zeolites described herein can contain impurities, such as amorphous materials, unit cells having framework topologies which do not coincide with the LEV-type zeolite, and/or other impurities (e.g., organic hydrocarbons).

During the hydrothermal crystallization step, the LEV-type zeolite crystals can be allowed to nucleate spontaneously from the reaction mixture.

Once the LEV-type zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The LEV-type zeolite can be used as-synthesized, but typically will be thermally treated (calcined). The term "as-synthesized" refers to the zeolite in its form after crystallization, prior to removal of the SDA cation. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the zeolite. The SDA can also be removed by photolysis techniques (e.g., exposing the SDA-containing zeolite product to light or electromagnetic radiation that has a wavelength shorter than visible light under conditions sufficient to selectively remove the organic compound from the zeolite) as described in U.S. Pat. No. 6,960,327.

The LEV-type zeolite can subsequently be calcined in steam, air or inert gas at temperatures ranging from 200° C. to 800° C. for periods of time ranging from 1 to 48 hours, or more. Usually, it is desirable to remove the alkali metal cation (if any) by ion exchange and replace it with hydrogen, ammonium, or any desired metal-ion.

The LEV-type zeolite made from the process described herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite can be extruded before drying, or, dried or partially dried and then extruded.

The LEV-type zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. Nos. 4,910,006 and 5,316,753.

Characterization of the LEV-Type Zeolite

LEV-type zeolites made by the process described have a composition, as-synthesized and in the anhydrous state, as described in Table 2 (in terms of mole ratios), wherein Q is as described herein above:

TABLE 2

| | Broad | Exemplary |
|---|---|---|
| $SiO_2/Al_2O_3$ | 10 to 100 | 30 to 60 |
| $Q/SiO_2$ | 0.01 to 0.10 | 0.02 to 0.07 |
| $F/SiO_2$ | 0 to 0.03 | 0 to 0.03 |

EXAMPLES

The following illustrative examples are intended to be non-limiting.

Example 1

Synthesis of N-methyl quinuclidinium hydroxide

N-methyl quinuclidinium cation was prepared from quinuclidine and iodomethane as described in U.S. Pat. No. 4,842,836. The quaternary ammonium compound was then ion exchanged using hydroxide exchange resin AG® 1-X8 from Bio-Rad. The exchanged solution was titrated for molarity. The yield of exchange was greater than 90%.

Example 2

0.11 g of $NH_4F$ was mixed with 30.51 g of an aqueous solution of N-methyl quinuclidinium hydroxide (OH=0.59 mmol/g) in a 125 cc Teflon cup. After complete dissolution of the ammonium fluoride, 4.14 g of CBV 760 (Zeolyst, H-Y zeolite, $SiO_2/Al_2O_3$ mole ratio=60) was added. The mixture was stirred with a spatula and then excess water was allowed to evaporate at room temperature. The final molar composition of the gel was:

25 $SiO_2$: 0.43 $Al_2O_3$: 250 $H_2O$: 7.5 SDA-OH: 1.25 $NH_4F$

At this point, the Teflon cup was closed and sealed in a stainless steel autoclave. The reaction was heated at 150° C. while rotating at 43 rpm for 7 days. Upon crystallization, the gel was recovered from the autoclave, filtered and rinsed with deionized water. Powder XRD of the dried product crystals (FIG. 1) confirmed the sample to be pure LEV. The powder XRD patterns presented herein were collected by standard techniques. ICP analysis of the product gave a $SiO_2/Al_2O_3$ mole ratio of 55.

Example 3

0.019 g of $NH_4F$ was mixed with 5.08 g of an aqueous solution of N-methyl quinuclidinium hydroxide (OH=0.59 mmol/g) in a 23 cc Teflon cup. After complete dissolution of the ammonium fluoride, 0.72 g of CBV 720 (Zeolyst, H-Y zeolite, $SiO_2/Al_2O_3$ mole ratio=30) was added. The mixture was stirred with a spatula and then excess water was allowed to evaporate at room temperature. The final molar composition of the gel was:

25 $SiO_2$: 0.83 $Al_2O_3$: 250 $H_2O$: 7.5 SDA-OH: 1.25 $NH_4F$

Figure 2:
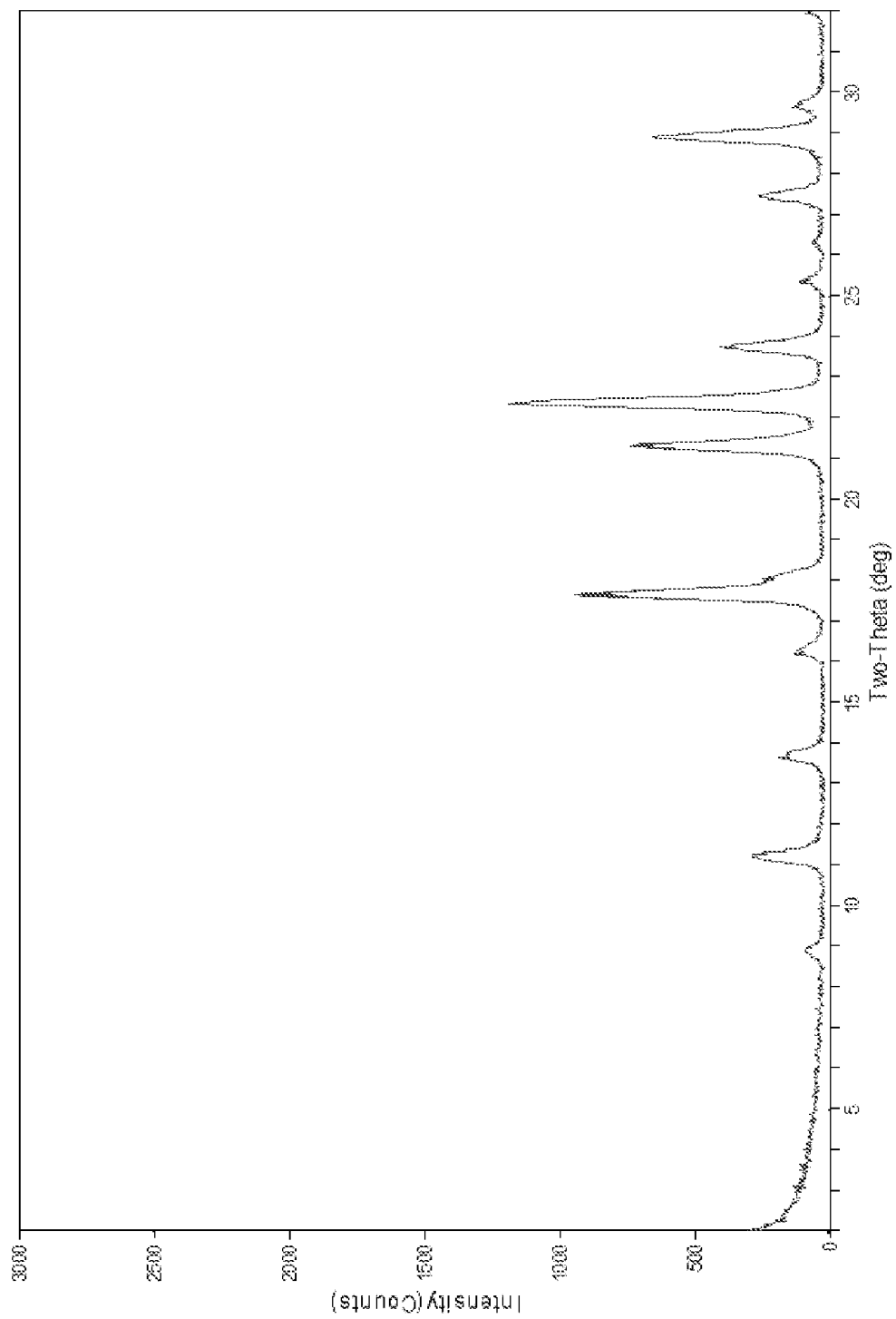
FIG. 2 shows the powder XRD pattern of the as-synthesized aluminosilicate product of Example 3.

At this point, the Teflon cup was closed and sealed in a stainless steel autoclave. The reaction was heated at 150° C. while rotating at 43 rpm for 7 days. Upon crystallization, the gel was recovered from the autoclave, filtered and rinsed with deionized water. Powder XRD of the dried product crystals (FIG. 2) confirmed the sample to be pure LEV. ICP analysis of the product gave a $SiO_2/Al_2O_3$ mole ratio of 33.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A method for preparing a LEV-type zeolite, comprising:
   (a) preparing a reaction mixture consisting of (1) a FAU-type zeolite; (2) fluoride ions; (3) an N-methyl quinuclidinium cation having an anionic counterion which is not detrimental to the formation of the LEV-type zeolite; and (4) water; and
   (b) maintaining the reaction mixture under conditions sufficient to form crystals of the LEV-type zeolite;
   wherein the reaction mixture consists of, in terms of mole ratios, the following:
   $SiO_2/Al_2O_3$ 10 to 100
   $Q/SiO_2$ 0.1 to 1.0
   $F/SiO_2$ 0.01 to 0.5
   $H_2O/SiO_2$ 3 to 50
   wherein Q is an N-methyl quinuclidinium cation.

2. The method of claim 1, wherein the LEV-type zeolite has a composition, as-synthesized and in its anhydrous state, in terms of mole ratios, as follows:

| | |
|---|---|
| $SiO_2/Al_2O_3$ | 10 to 100 |
| $Q/SiO_2$ | 0.01 to 0.10 |
| $F/SiO_2$ | 0.01 to 0.03 | wherein Q is an N-methyl quinuclidinium cation.

3. The method of claim 1, wherein the LEV-type zeolite has a composition, as-synthesized and in its anhydrous state, in terms of mole ratios, as follows:

| | |
|---|---|
| $SiO_2/Al_2O_3$ | 30 to 60 |
| $Q/SiO_2$ | 0.02 to 0.07 |
| $F/SiO_2$ | 0.01 to 0.03 | wherein Q is an N-methyl quinuclidinium cation.

4. The method of claim 1, wherein the reaction mixture consists of, in terms of mole ratios, the following:

| | |
|---|---|
| $SiO_2/Al_2O_3$ | 30 to 60 |
| $Q/SiO_2$ | 0.15 to 0.4 |
| $F/SiO_2$ | 0.03 to 0.1 |
| $H_2O/SiO_2$ | 5 to 30 | wherein Q is an N-methyl quinuclidinium cation.

5. The method of claim 1, wherein the FAU-type zeolite is zeolite Y.

* * * * *